United States Patent
Li et al.

(10) Patent No.: US 12,245,128 B2
(45) Date of Patent: Mar. 4, 2025

(54) METHOD AND SYSTEM FOR PERFORMING TRANSMISSION OF DATA BETWEEN BASE STATION AND TERMINAL

(71) Applicant: MITSUBISHI ELECTRIC CORPORATION, Tokyo (JP)

(72) Inventors: Qianrui Li, Rennes (FR); Nicolas Gresset, Rennes (FR)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 539 days.

(21) Appl. No.: 17/632,417

(22) PCT Filed: Oct. 5, 2020

(86) PCT No.: PCT/JP2020/038412
§ 371 (c)(1),
(2) Date: Feb. 2, 2022

(87) PCT Pub. No.: WO2021/075390
PCT Pub. Date: Apr. 22, 2021

(65) Prior Publication Data
US 2022/0303865 A1    Sep. 22, 2022

(30) Foreign Application Priority Data

Oct. 15, 2019 (EP) .................................. 19203186

(51) Int. Cl.
- *H04B 7/06* (2006.01)
- *H04W 40/12* (2009.01)
- *H04W 40/20* (2009.01)

(52) U.S. Cl.
CPC ............ *H04W 40/12* (2013.01); *H04B 7/063* (2013.01); *H04B 7/0695* (2013.01); *H04W 40/20* (2013.01)

(58) Field of Classification Search
None
See application file for complete search history.

(56) References Cited

U.S. PATENT DOCUMENTS

| 2018/0331935 A1 | 11/2018 | Ross et al. | |
| 2021/0051512 A1* | 2/2021 | Hampel | H04W 80/06 |
| 2021/0266815 A1* | 8/2021 | Wei | H04W 88/14 |

FOREIGN PATENT DOCUMENTS

| JP | 2008-543163 A | 11/2008 |
| JP | 2018-519722 A | 7/2018 |

OTHER PUBLICATIONS

"3rd Generation Partnership Project; Technical Specification Group Radio Access Network; NR; Study on Integrated Access and Backhaul; (Release 16)", 3GPP TR 38.874, 2018, total 111 pages.

(Continued)

*Primary Examiner* — Minh Trang T Nguyen
(74) *Attorney, Agent, or Firm* — Birch, Stewart, Kolasch & Birch, LLP (57) ABSTRACT

A value of a first figure of merit representative of routing performance throughout the multi-hop network is obtained. Independently of the values of the first figure of merit, a value of a second figure of merit representative of transmission performance between the base station and the multi-hop network for each candidate configuration of transmission between the base station and the entry points of the multi-hop network is computed. Values of a third figure of merit representative of a trade-off between routing performance throughout the multi-hop network and transmission performance between the base station and the multi-hop network is then computed by combining values of the first figure of merit and of the second figure of merit. Then, the candidate configuration which shows the best value of the third figure of merit is selected to perform the transmission of data.

12 Claims, 4 Drawing Sheets

(56) References Cited

OTHER PUBLICATIONS

"Discussion on enhancements to support NR backhaul links", 3GPP TSG RAN WG1 Meeting #94bis, R1-1811359, NTT Docomo, Inc., 2018, total 8 pages.

International Search Report for PCT/JP2020/038412 mailed on Apr. 6, 2021.

Key et al., "Path Selection and Multipath Congestion Control", IEEE INFOCOM, 2007—26th IEEE International Conference on Computer Communications, May 2007, pp. 143-151, total 9 pages.

Written Opinion of the International Searching Authority for PCT/JP2020/038412 mailed on Apr. 6, 2021.

3GPP, "3rd Generation Partnership Project; Technical Specification Group Radio Access Network; NR; Study on Integrated Access and Backhaul (Release 16)" 3GPP TR 38.874, V16.0.0, Dec. 2018, pp. 1-15.

Japanese Office Action for Japanese Application No. 2022-527478 dated Nov. 8, 2022, with English translation.

Japanese Office Action for Japanese Application No. 2022-527478, dated Mar. 14, 2023, with English translation.

SA WG2, "New WID: Architecture enhancement for the support of IAB", 3GPP TSG SA Meeting #85, SP-190627, Sep. 17-20, 2019, Newport Beach, USA, 4 pages total.

3GPP, 3rd Generation Partnership Project; Technical Specification Group Radio Access Network; Study on Integrated Access and Backhaul; (Release 15), 3GPP TR 38.874 1.0.0, Dec. 4, 2018, pp. 1-111.

Chinese Office Action and Search Report for Chinese Application No. 202080070845.1, dated Apr. 21, 2023, with an English translation.

NTT Docomo, Inc., "Discussion on Enhancements to Support NR Backhaul Links", R1-1811359, 3GPP TSG RAN WG1 Meeting #94bis, Chengdu, China, Oct. 8-12, 2018, pp. 1-8.

\* cited by examiner

METHOD AND SYSTEM FOR PERFORMING TRANSMISSION OF DATA BETWEEN BASE STATION AND TERMINAL

TECHNICAL FIELD

The present invention generally relates to performing transmission between a base station and a terminal via a multi-hop network, wherein the base station performs downlink and/or uplink communications through the multi-hop network by using wireless transmissions with entry points of the multi-hop network that relay data within the multi-hop network.

BACKGROUND ART

Multi-hop networks are networks for which relays are used to increase transmission range. Multi-hop relaying is thus a coverage extension technology that uses spatially dispersed interconnected node devices so as to form a multi-hop network. For instance, in millimeter waves (mmW) wireless communications, multi-hop relaying helps fight against high propagation loss, blockage and mobility sensitivity. As an example, such multi-hop networks are mesh-topology networks, which provide multipath capabilities between at least some of the interconnected node devices. As another example, such multi-hop networks are for instance linear-topology networks.

A use case of multi-hop networks, with linear topology, is data exchange with at least one terminal on-board a train. As an example, such a terminal is a controlling machine adapted to remotely operate the train or assist operation thereof. As another example, such a terminal is an on-board display screen providing travel information to passengers. As yet another example, such a terminal is a passenger web browsing device. As yet another example, such a terminal is a video camera enabling video surveillance in the train. Base stations are present along the railways so as to put into communication the on-board terminal with a remote server. The cars of the train are equipped with a multi-hop network including several node devices that are capable to communicate with the base station and that consequently use multipath of the mesh-topology network so as to ensure communications with the on-board terminal. The node devices that are capable to communicate with the base station then act as entry points to the multi-hop network. In view of the length of trains, using such a multi-hop network with linear topology enables increasing the communication range, therefore increasing the distance between the base stations deployed along the railways. Moreover, static or dynamic beamforming may be used so as to increase transmission gain and mitigate interferences. It is thus desirable to appropriately select the entry point of the multi-hop network and to appropriately configure the base station in accordance, so as to increase performance of the communications between the base station and the on-board terminal.

Another use case of multi-hop networks, with mesh topology, is control of robots in a manufacturing by using a server, or central unit, remotely controlling the robots. The server, or central unit, is connected to a base station that is able to communicate with a plurality of node devices of a mesh-topology network to which are connected the robots. The server, or central unit, thus uses the base station and the mesh-topology network in order to send commands to the robots and to receive monitoring information from sensors associated with the robots. The mesh-topology network includes several node devices that are capable to communicate with the base station and that then use multipath capability of the mesh-topology network so as to ensure communications with the robots and sensors. The base station uses dynamic beamforming so as to target one or more of said node devices that are capable to communicate with the base station and thus increase transmission gain and mitigate interferences. The node devices that are capable to communicate with the base station then act as entry points to the multi-hop network. It is thus desirable to appropriately select the entry point of the multi-hop network and to appropriately configure the base station in accordance, so as to increase performance of the communications between the base station and the robots and/or sensors.

SUMMARY OF INVENTION

To that end, the present invention concerns a method for performing a transmission of data between a base station and a terminal, the terminal being included in a multi-hop network, the base station is able to communicate with entry points of the multi-hop network using beamforming, wherein the method includes: obtaining, from the multi-hop network, for each entry point of the multi-hop network, a value of a first figure of merit representative of routing performance throughout the multi-hop network between said entry point of the multi-hop network and said terminal; computing, independently of the values of the first figure of merit, a value of a second figure of merit representative of transmission performance between the base station and the multi-hop network, one value of the second figure of merit being computed for each candidate configuration among predefined candidate configurations of transmission between the base station and the entry points of the multi-hop network; computing values of a third figure of merit combining values of the first figure of merit and of the second figure of merit, the third figure of merit being representative of a trade-off between routing performance throughout the multi-hop network and transmission performance between the base station and the multi-hop network; selecting, for performing the transmission of data, a candidate configuration which shows the best value of the third figure of merit according to transmission performance between the base station and the terminal; and performing the transmission of data via the selected entry point of the multi-hop network and by applying the selected candidate configuration.

Thus, selection of the entry point of the multi-hop network and of appropriate configuration of the base station are jointly considered so as to increase performance of the communications between the base station and the terminal via the multi-hop network. Using a figure of merit for the routing through the multi-hop network and independently another figure of merit for transmissions between the base station and the entry points of the multi-hop network significantly ease the selection of the entry point of the multi-hop network and of appropriate configuration of the base station.

According to a particular embodiment, each candidate configuration is: a couple formed by one targeted entry point of the multi-hop network and a beamforming configuration of the base station among a predefined set of beamforming configurations; or a couple formed by one targeted entry point of the multi-hop network and a direction of signal propagation by applying a predefined beamforming configuration of the base station; or a couple formed by one targeted entry point of the multi-hop network and an instant at which the transmission of data in question might be performed by applying a predefined beamforming configuration of the base station.

According to a particular embodiment, the value of the second figure of merit depends on transmission channel capacity between the base station and the multi-hop network.

According to a particular embodiment, the value of the second figure of merit depends on latency of transmission between the base station and the multi-hop network.

According to a particular embodiment, the value of the second figure of merit depends on achievable throughput between the base station and at least one adjacent base station, on the one hand, and the multi-hop network, on the other hand.

According to a particular embodiment, the value of the second figure of merit depends on latency of transmission between the base station and at least one adjacent base station, on the one hand, and the multi-hop network, on the other hand.

According to a particular embodiment, the value of the first figure of merit represents transmission latency between the entry point of the multi-hop network with which said value of the first figure of merit is associated and the terminal.

According to a particular embodiment, the value of the first figure of merit represents achievable throughput between the entry point of the multi-hop network with which said value of the first figure of merit is associated and the terminal.

According to a particular embodiment, the multi-hop network moves on a predetermined trajectory, and wherein the value of the second figure of merit depends on position on the predetermined trajectory and on speed of the multi-hop network.

According to a particular embodiment, the multi-hop network is installed on a train, wherein each car of the train embeds one node device of the multi-hop network, each node device being equipped with two antennas respectively placed at the front and rear of the car embedding said node device.

The present invention also concerns a system for performing a transmission of data between a base station and a terminal, the terminal being included in a multi-hop network, the base station is able to communicate with entry points of the multi-hop network using beamforming, wherein the system includes: means for obtaining, from the multi-hop network, for each entry point of the multi-hop network, a value of a first figure of merit representative of routing performance throughout the multi-hop network between said entry point of the multi-hop network and said terminal; means for computing, independently of the values of the first figure of merit, a value of a second figure of merit representative of transmission performance between the base station and the multi-hop network, one value of the second figure of merit being computed for each candidate configuration among predefined candidate configurations of transmission between the base station and the entry points of the multi-hop network; means for computing values of a third figure of merit combining values of the first figure of merit and of the second figure of merit, the third figure of merit being representative of a trade-off between routing performance throughout the multi-hop network and transmission performance between the base station and the multi-hop network; means for selecting, for performing the transmission of data, a candidate configuration which shows the best value of the third figure of merit according to transmission performance between the base station and the terminal; and means for performing the transmission of data via the selected entry point of the multi-hop network and by applying the selected candidate configuration.

The present invention also concerns a computer program that can be downloaded from a communication network and/or stored on a non-transitory information storage medium that comprises program code instructions that can be read and executed by a processing device, such as a microprocessor, for causing implementation of the aforementioned method in any one of its embodiments. The present invention also concerns a non-transitory information storage medium, storing such a computer program.

The characteristics of the invention will emerge more clearly from a reading of the following description of at least one example of embodiment, said description being produced with reference to the accompanying drawings.

DESCRIPTION OF EMBODIMENTS

Figure 1:
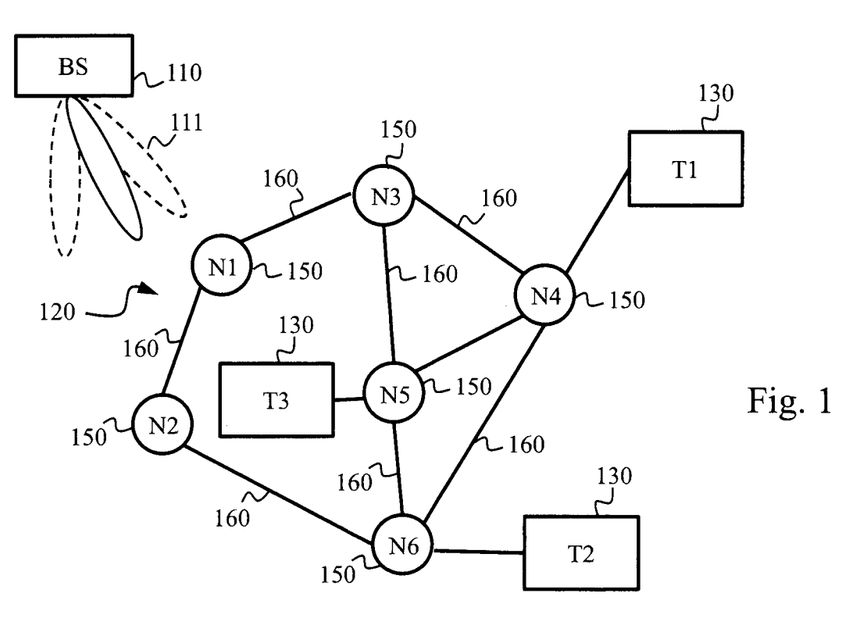
FIG. 1 schematically represents a first context in which the present invention may be implemented.

FIG. 1 schematically represents a first context in which the present invention may be implemented. In the first context, a communication system includes a base station BS 110, as well as a multi-hop network 120. The multi-hop network 120 comprises plural node devices N1, N2, N3, N4, N5, N6 150 interconnected by links 160 so as to form a mesh topology. The links 160 may be wired links or wireless links.

At least some of the node devices N1, N2, N3, N4, N5, N6 150 include a wireless interface so as to be capable to communicate with the base station BS 110, when appropriate radio propagation conditions are met. From the standpoint of the base station BS 110, the node devices 150 that are capable to communicate with the base station BS 110 act as entry points to the multi-hop network 120. At least one terminal T1, T2, T3 130 is connected to the multi-hop network 120, which thus enables said at least one terminal T1, T2, T3 130 to communicate with the base station BS 110.

In order to select the appropriate entry point to the multi-hop network 120, the base station BS 110 uses dynamic beamforming 111, which is a well-known signal processing technique relying on dynamically configuring sensor arrays for directional signal transmission and/or reception. Dynamic beamforming 111 is used to specifically target one of said node devices 150 that are capable to communicate with the base station BS 110 and to thus increase transmission gain and mitigate interferences.

Selecting the appropriate entry point to the multi-hop network 120 takes into account a figure of merit representative of transmission performance between the base station BS 110 and the multi-hop network 120, as detailed hereafter.

According to a first embodiment, transmission performance between the base station BS 110 and the multi-hop network 120 is determined according to transmission channel capacity. The node devices 150 that are capable to communicate with the base station BS 110 determine channel state information CSI and feedback the determined channel state information CSI to the base station BS 110, for instance in a dedicated time slot, for each candidate beam configuration usable by the base station BS 110. To do so, the base station BS 110 transmits on a regular basis pilot signals by using each candidate beam configuration usable by the base station BS 110. Dedicated time slots can be used for this purpose in order to enable the base station BS 110 to take into account changes (appearance, disappearance . . . ) in interferences or shadowing effects in radio propagation conditions between the base station BS 110 and the node devices 150 that are capable to communicate with the base station BS 110. Referring to 5G transmission technology (also referred to as LTE-B technology), the base station BS 110 performs beam management procedure by transmitting on a regular basis a beamformed reference signal (RS), and further receiving consequently beam measurement reports from the node devices 150 that are capable to communicate with the base station BS 110. Accordingly, the base station BS 110 is able to compute, for each entry point of the multi-hop network 120, a value of a figure of merit representative of transmission performance between the base station BS 110 and the multi-hop network 120. Considering that the entry points of the multi-hop network 120 are associated with distinct directions of signal propagation from the base station BS 110, and also knowing that with different beamforming configurations signal propagation between the base station BS 110 and any one of the entry points of the multi-hop network 120 varies, the base station BS 110 is able to compute, for each combination of the selected entry point of the multi-hop network 120 and chosen dynamic beamforming configuration, a value of a figure of merit representative of transmission performance between the base station BS 110 and said multi-hop network 120.

According to a second embodiment, transmission performance between the base station BS 110 and the multi-hop network 120 is determined according to considerations of latency of transmission between the base station BS 110 and the multi-hop network 120. The latency of transmission can be calculated based on transmission channel capacity, total amount of information to be transferred between the base station BS 110 and the multi-hop network 120, and filling states of buffers of each entry point of the multi-hop network 120. Transmission channel capacity C can be evaluated with the same method described with respect to the first embodiment. The total amount of information S to be transmitted is known at the base station BS 110. The buffer filling state t is the extra delay that the considered node device 150 needs in order to finish transmitting the packets in its buffer and starts to receive information from base station BS 110. Each of the node device 150 is capable of monitoring its buffer state t and transmitting this information to the base station BS 110 using a certain uplink time slot in a periodic way. Once the base station BS 110 has obtained information about transmission channel capacity $C_i$ (wherein i is an index for identifying the entry points of the multi-hop network 120), the total amount of information S and the buffer state $t_i$ for the i-th node device 150 serving as entry point of the multi-hop network 120, the base station BS 110 is able to compute a latency value $$T_i = t_i + \frac{S}{C_i},$$

namely a value of a figure of merit representative of transmission performance between the base station BS 110 and multi-hop network 120 when using the i-th node device 150 serving as entry point of the multi-hop network 120 and certain beamforming configuration.

According to a third embodiment related to coordinated base stations, transmission performance between the base station BS 110 and the multi-hop network 120 is determined according to achievable throughput between the base station BS 110 and at least one adjacent base station (typically one or more base stations having radio range overlapping with radio range of base station BS 110), on the one hand, and the multi-hop network 120, on the other hand. In this third embodiment, two sub-cases can be distinguished.

The first sub-case is that a plurality of base stations, including the base station BS 110, perform coordinated beamforming. In this first sub-case, achievable throughput can be calculated as the sum of individual throughput between each base station of the plurality of base stations and the multi-hop network 120. The individual throughput calculation is similar to the transmission channel capacity calculation described in the first embodiment. A major difference is that, since multiple base stations including the base station BS 110 transmit at the same time, signals sent from one base station are seen as interference signals to the other base stations. Therefore, the node devices 150 [150] that are capable to communicate with the base station BS 110 are further capable to feedback interference information to the base station BS 110, for instance in a dedicated uplink time slot. To do so, the base station BS 110 transmits on a regular basis pilot signals. Dedicated downlink time slots can be used for this purpose in order to enable the base station BS 110 to take into account changes (appearance, disappearance . . . ) in interferences in radio propagation conditions between the base station BS 110 and the node devices 150 that are capable to communicate with the base station BS 110. Referring to 5G transmission technology (also referred to as LTE-B technology), the base station BS 110 performs interference measurement by transmitting on a regular basis using Channel State Information-Interference Measurement (CSI-IM) resource, and by further receiving consequently interference measurement reports from the node devices 150 that are capable to communicate with the base station BS 110. In the reverse direction, the base station BS 110 can measure interference when receiving signals from the entry points of the multi-hop network 120, and thus deduce corresponding achievable throughput taking into account interference, namely log (1+SINR), wherein SINR represents Signal-to-Interference-plus-Noise Ratio. The base station BS 110 typically shares interference information with each adjacent base station, and vice versa. Thus, the base station BS 110 is able to compute an interference value, namely a value of a figure of merit representative of transmission performance between the base station BS 110 and multi-hop network 120 when using such or such node device 150 serving as entry point of the multi-hop network 120 and certain beamforming configuration.

The second sub-case is that a plurality of base stations, including the base station BS 110, form a Multiple Input Multiple Output (MIMO) transmission system and perform Coordinated Multi-Point (COMP) transmission. In this second sub-case, the achievable throughput is the throughput for the MIMO COMP transmission system. Similar to the description in the first embodiment, the node devices 150 that are capable to communicate with the base station BS 110 determine channel state information CSI and feedback the determined channel state information CSI to the base station BS 110. A difference from the first embodiment is that, rather than having each concerned base station BS 110 independently computing a value of figure of merit for the transmission performance, the base stations, including the base station BS 110, transmit the determined channel state information CSI to a central unit, which computes achievable throughput for the CoMP transmission system, namely a value of a figure of merit representative of transmission performance between the base station BS 110 and multi-hop network 120 when using such or such node device 150 serving as entry point of the multi-hop network 120 and certain beamforming configuration.

According to a fourth embodiment related to coordinated base stations, transmission performance between the base station BS 110 and the multi-hop network 120 is determined according to latency of transmission between the base station BS 110 and at least one adjacent base station (typically base station having radio range overlapping with radio range of base station BS 110), on the one hand, and the multi-hop network 120, on the other hand. The latency of transmission can be calculated based on transmission throughput, total amount of information from base station BS 110 to the multi-hop network 120, and filling states of buffers of the entry points of the multi-hop network 120. Similarly as for the third embodiment, two sub-cases can be distinguished in this fourth embodiment.

The first sub-case is that a plurality of base stations, including the base station BS 110, perform coordinated beamforming. In this sub-case, the latency of the transmission is the maximal latency among the latencies of transmission between the plurality of base stations and the multi-hop network 120. Details of the latency calculation for transmission between the plurality of base stations, including the base station BS 110, and the multi-hop network can be referred to the second embodiment and the first sub-case of the third embodiment.

The second sub-case is that the concerned base stations BS 110 perform Coordinated Multi-Point (COMP) transmission. Details of the latency calculation for transmission between the CoMP transmission system and the multi-hop network can be referred to the second embodiment and sub-case 2 of the third embodiment.

In a particular embodiment, transmission performance between the base station BS 110 and the multi-hop network 120 can be evaluated using a combination of the criteria defined above with respect to the first to fourth embodiments disclosed above in relation to FIG. 1.

Moreover, at least one of the node devices 150 that are capable to communicate with the base station BS 110 transmits to the base station BS 110, for each entry point of the multi-hop network 120, a value of another figure of merit representative of routing performance throughout the multi-hop network 120 to communicate with one or another terminal among the terminals T1, T2, T3 130. The figure of merit representative of routing performance throughout the multi-hop network 120 is herein referred to as first figure of merit. The values of the first figure of merit may be computed by another node device 150 than the one transmitting said computed values to the base station BS 110. The values of the first figure of merit may be service-related, meaning that the values of the first figure of merit may depend on a type of service (best effort, video streaming, audio streaming . . . ) with which are associated the data to be transmitted between the base station BS 110 and the terminal T1, T2, T3 130 in question. When the multi-hop network 120 provides service-based routing (for instance by relying on class-of-service (CoS) field of packets headers), the multi-hop network 120 provides as many values of the first figure of merit, for each entry point of the multi-hop network 120, as the quantity of types of services that is the multi-hop network 120 is able to deal with.

The figure of merit representative of transmission performance between the base station BS 110 and the multi-hop network 120 is herein referred to as second figure of merit.

A combination of the values of the first and second figures of merit is then evaluated by the base station BS 110 thanks to a combining figure of merit, referred herein to as third figure of merit, so as to decide which beamforming configuration and which entry point to the multi-hop network 120 apply best to perform transmission of data between one or another terminal among the terminals T1, T2, T3 130 and the base station BS 110. The third figure of merit is thus representative of a trade-off between routing performance throughout the multi-hop network 120 and transmission performance between the base station BS 110 and the multi-hop network 120. In this way, the base station BS 110 is able to decide which entry point to the multi-hop network 120 has to be targeted with which configuration of the dynamic beamforming 111, without having to be aware of detailed effective routing in the multi-hop network 120, since routing performance throughout the multi-hop network 120 and transmission performance between the base station BS 110 and the multi-hop network 120 are separately addressed by respectively the first and second figures of merit, which can thus be asynchronously obtained and independently managed by the base station BS 110.

Figure 2:
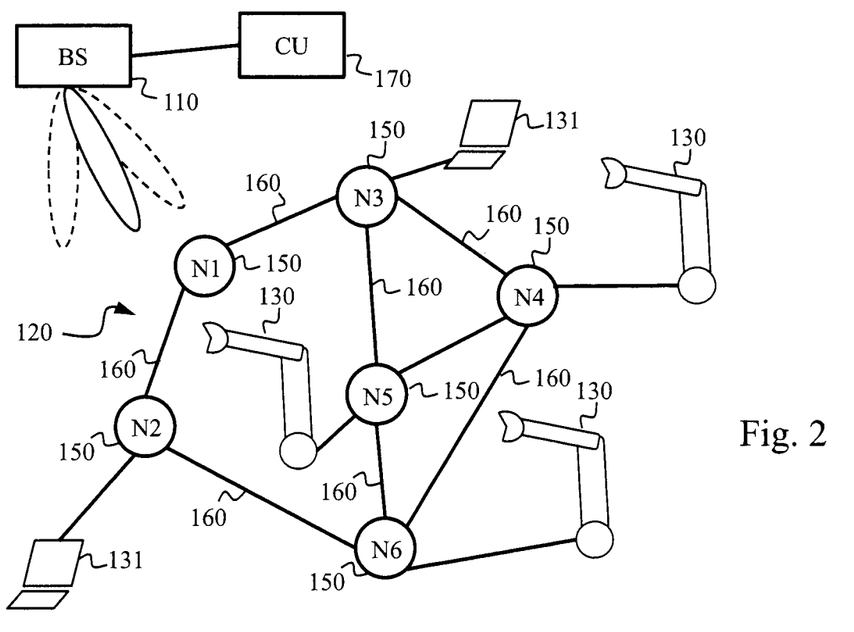
FIG. 2 schematically represents a use case of the first context depicted in FIG. 1.

FIG. 2 schematically represents a use case of the first context depicted in FIG. 1. The terminals T1, T2, T3 130 are robots of a manufacturing plant. The node devices 150 of the multi-hop network 120 interconnect the robots, and potentially sensors associated therewith, and further provide access to the multi-hop network 120 from the base station BS 110. By using the base station BS 110, a central unit CU 170 is able to control the robots, and is potentially able to monitor operation of the robots thanks to information provided by the sensors.

The multi-hop network 120 may be shared by other devices, such as computers 131, which may impact routing throughout the multi-hop network 120 in view of bandwidth consumption variations due to such a sharing of the multi-hop network 120.

For each entry point to the multi-hop network 120, each node device 150 to which one robot is connected computes a value of the first figure of merit, so as to classify the possible routing options throughout the multi-hop network 120 for reaching the robot in question. When several options exist to reach the robot in question from one entry point of the multi-hop network 120 thanks to multipath capacity of the multi-hop network 120, the concerned node device 150 retains the value of the first figure of merit showing the best routing performance. Then the node devices 150 transmit the computed values of the first figure of merit toward the base station BS 110 (via the multi-hop network 120 for node devices that are not entry points of the multi-hop network 120).

When there is a significant change in capacity of at least one link between the node devices 150 of the multi-hop network 120 (node device disappearance, node device appearance, modification of bandwidth consumption above a predefined threshold . . . ), the node devices 150 recompute the values of the first figure of merit and provide updated values thus computed to the base station BS 110.

The base station BS 110 computes, independently of the computation of the values of the first figure of merit, one value of the second figure of merit for each entry point to the multi-hop network 120. Then, the base station BS 110 computes, for each entry point to the multi-hop network 120, the value of the third figure of merit from the values of the first and second figures of merit for said entry point to the multi-hop network 120. Then, the base station BS 110 selects the beamforming configuration so as to target the entry point to the multi-hop network 120 showing the best value of the third figure of merit with respect to transmission performance between the base station BS 110 and the considered robot (or the sensor potentially associated therewith).

Considering uplink transmissions of data from the terminal T1, T2 or T3 130 to the base station BS 110 (the opposite direction being considered as downlink transmissions), signaling information has to be transmitted from the base station BS 110 to the terminal T1, T2 or T3 in question, so as to indicate to the terminal T1, T2 or T3 in question at least via which entry point of the multi-hop network 120 said data has to be transmitted to the base station BS 110.

When there is a change in the value of the first figure of merit and/or in the value of the second figure of merit for at least one entry point of the multi-hop network 120, the base station BS 110 recomputes the value of the third figure of merit for said at least one entry point of the multi-hop network 120. Then the base station BS 110 adapts, if needed, the beamforming configuration so as to target the entry point to the multi-hop network 120 showing the best value of the third figure of merit with respect to transmission performance between the base station BS 110 and the considered robot (or the sensor potentially associated therewith).

Figure 3:
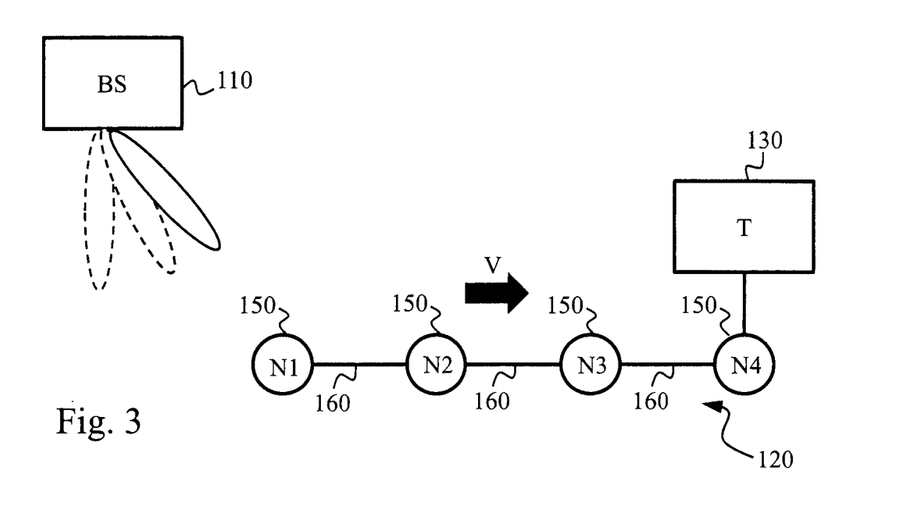
FIG. 3 schematically represents a second context in which the present invention may be implemented.

FIG. 3 schematically represents a second context in which the present invention may be implemented. In the second context, a communication system includes a base station BS 110, as well as a multi-hop network 120. The multi-hop network 120 comprises plural node devices N1, N2, N3, N4 150 interconnected by links 160 so as to form a linear topology. The links 160 may be wired links, but are preferably wireless links. In the scope of FIG. 3, the relative positions of the node devices 150 of the multi-hop network 120 are fixed and known. It means that there is no relative movement between the node devices 150. Moreover, the multi-hop network 120 moves along a predefined path, such as a railway.

At least some of the node devices N1, N2, N3, N4 150 include a wireless interface so as to be capable to communicate with the base station BS 110, when appropriate radio propagation conditions are met. From the standpoint of the base station BS 110, the node devices 150 that are capable to communicate with the base station BS 110 act as entry points to the multi-hop network 120. At least one terminal T 130 is connected to the multi-hop network 120, which thus enables said at least one terminal T 130 to communicate with the base station BS 110.

Compared with the first context, the second context differs in that the multi-hop network 120 moves on a predetermined trajectory with a speed V, which may vary over time. In other words, in the second context, the node devices jointly move over time, which creates a relative movement with respect to the base station BS 110.

In order to select the appropriate entry point to the multi-hop network 120, the base station BS 110 uses beamforming 111, so as to target at appropriate instant(s), in view of the relative movement of the multi-hop network 120 with respect to the base station BS 110, one of said node devices 150 that are capable to communicate with the base station BS 110 and to thus increase transmission gain and mitigate interferences. Static or dynamic beamforming may be used, since there is a relative movement of the multi-hop network 120 with respect to the base station BS 110.

In case of dynamic beamforming, transmission channel capacity can still be used as transmission performance metric between the base station BS 110 and the multi-hop network 120. Same approach as described in the first embodiment for FIG. 1 can be applied. A difference is that since the multi-hop network 120 has here high mobility, specific reference signal pattern should be used so as to fight against high Doppler effect.

Figure 7:
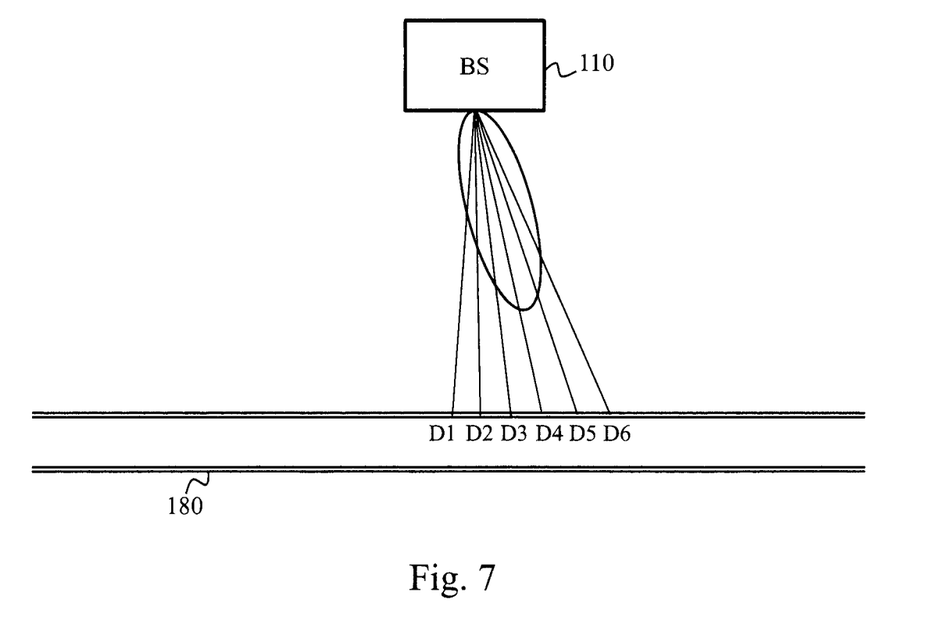
FIG. 7 schematically represents an example of a plurality of signal propagation directions for a beamforming configuration.

In case of static beamforming, the base station BS 110 cannot rely on CSI for determining the value of the second figure of merit, contrary to the first context shown in FIG. 1. Thus, according to a first embodiment, path loss estimation is used in the second context shown in FIG. 3 for determining the value of the second figure of merit representative of transmission performance between the base station BS 110 and the multi-hop network 120. An example is shown in FIG. 7. Considering a beamforming configuration, FIG. 7 illustratively shows a primary lobe of antenna diagram and plural directions D1, D2, D3, D4, D5, D6 from the base station BS 110 toward the predefined path 180 over which a signal transmitted by the base station BS 110 according to the beamforming configuration is propagated. Due to directivity of antenna diagram, in view of the shape of the primary lobe, signal strength typically differs from one direction to another among said plural directions D1, D2, D3, D4, D5, D6. Path loss can thus be estimated by the base station BS 110 from a priori knowledge of the antenna diagram corresponding to the beamforming configuration in question and of geographical topology between the base station BS 110 and the predefined path 180. Information of geographical topology may be known from a database indicating, for each direction D1, D2, D3, D4, D5, D6, whether or not an obstacle is a priori present between the base station BS 110 and the predefined path 180 (e.g. trees) and further providing information of distance between the base station BS 110 and the predefined path 180 by taking into account trajectory of the predefined path 180. Path loss estimation can therefore be obtained from signal strength in the considered direction in view of the antenna diagram and of the distance from the base station BS 110 and the predefined path 180 in the considered direction, and further of potential shadowing or mitigation effects (e.g. modeled) due to a priori-known presence of any obstacle between the base station BS 110 and the predefined path 180 in the considered direction.

Path loss estimation is presented here above by using the primary lobe of antenna diagram. Such a path loss estimation is duplicated for each lobe of antenna diagram when said antenna diagram has plural lobes.

It should be noticed that when plural beamforming configurations are possible, it is also possible to use path loss estimation rather than CSI feedback and channel capacity calculation to choose the beam configuration and device 150 as entry point for multi-hop network 120. The path loss estimation approach presented above is then performed for each possible beamforming configuration. The advantage, comparing with using transmission channel capacity as transmission performance metric, is less complicate beamforming management and CSI feedback procedure.

According to a second embodiment, transmission performance between the base station BS 110 and the multi-hop network 120 is determined according to considerations of latency of transmission between the base station BS 110 and the multi-hop network 120. The latency of transmission can be calculated based on the transmission channel capacity, the total amount of information to be transmitted between the base station BS 110 to the multi-hop network 120, and filling states of buffers of the entry points of the multi-hop network 120. Further details of the latency transmission can be referred to the second embodiment for FIG. 1. The transmission channel capacity C can be estimated by path loss condition, using $C=\log(1+SNR)$, wherein SNR represents Signal-to-Noise Ratio, with signal part being estimated by signal transmission on serving path using path loss estimation. Details of path loss estimation can be found in the first embodiment for FIG. 3.

According to a third embodiment related to coordinated base stations, transmission performance between the base station BS 110 and the multi-hop network 120 is determined according to path loss between the base station BS 110 and at least one adjacent base station (typically base station having radio range overlapping with radio range of base station BS 110), on the one hand, and the multi-hop network 120, on the other hand. Further details can be referred to the third embodiment for FIG. 1. The transmission channel capacity C can be estimated by path loss conditions, using $C=\log(1+SINR)$, wherein it is recalled that SINR represents Signal-to-Interference-plus-Noise Ratio. When calculating SINR, signal part is estimated by signal transmission on serving path using path loss estimation and interference part is estimated by signal transmission on interfering path (signal generated by at least one other base station) using path loss estimation.

According to a fourth embodiment related to coordinated base stations, transmission performance between the base station BS 110 and the multi-hop network 120 is determined according to latency of transmission between the base station BS 110 and at least one adjacent base station (typically base station having radio range overlapping with radio range of base station BS 110), on the one hand, and the multi-hop network 120, on the other hand. The latency of transmission can be calculated based on the transmission channel capacity, total amount of information to be transmitted between the base station BS 110 and the multi-hop network 120, and the filling states of buffers of the entry point of the multi-hop network 120. The transmission channel capacity C can be estimated by path loss condition, using $C=\log(1+SINR)$, When calculating the SINR, signal part is estimated by signal transmission on serving path using path loss estimation and interference part is estimated by signal transmission on interfering path (signal generated by at least one other base station) using path loss estimation. Details of path loss estimation can be found in the first embodiment for FIG. 3. Further details can also be referred to the fourth embodiment for FIG. 1.

From the above, the base station BS 110 is able to compute, for each direction of a plurality of directions of signal propagation, a value of the second figure of merit, which is representative of transmission performance between the base station BS 110 and the multi-hop network 120.

In a particular embodiment, transmission performance between the base station BS 110 and the multi-hop network 120 can be evaluated using a combination of the criteria defined above with respect to the first to fourth embodiments disclosed above in relation to FIG. 3.

Moreover, at least one of the node devices 150 that are capable to communicate with the base station BS 110 transmits to the base station BS 110, for each entry point of the multi-hop network 120, a value of the first figure of merit, which is representative of routing performance throughout the multi-hop network 120 to communicate with the terminal T 130. The values of the first figure of merit may be computed by another node device 150 than the one transmitting said computed values to the base station BS 110. The values of the first figure of merit may be service-related, meaning that the values of the first figure of merit may depend on a type of service (best effort, video streaming, audio streaming . . . ) with which are associated the data to be transmitted between the base station BS 110 and the terminal T. When the multi-hop network 120 provides service-based routing (for instance by relying on class-of-service (CoS) field of packets headers), the multi-hop network 120 provides as many values of the first figure of merit, for each entry point of the multi-hop network 120, as the quantity of types of services that the multi-hop network 120 is able to deal with.

It may be noted that, due to mobility considerations, another base station may be used as a relay between the multi-hop network 120 and the base station BS 110. The node devices 150 that are capable to communicate with the base station BS 110 are thus node devices 150 that rely on such a relay to be capable to communicate with the base station BS 110 and that communicate directly with the base station BS 110 when appropriate radio propagation conditions are met. Typically, the values of the first figure of merit are transmitted to said another base station in a transmission cycle when the multi-hop network 120 is within radio range of said another base station, and said values of the first figure of merit are used to configure the base station BS 110 for a later communication with the multi-hop network 120 in a future transmission cycle when the multi-hop network 120 has entered radio range of the base station BS 110. Potentially one or more intermediate backbone infrastructure devices, such as a central or coordination unit, may be present between these two base stations.

When there is a significant change in capacity of at least one link between the node devices 150 of the multi-hop network 120 (node device disappearance, node device appearance, modification of bandwidth consumption above a predefined threshold . . . ), the node devices 150 recompute the values of the first figure of merit and provide updated values thus computed to the base station BS 110, by following the same process as described above.

The base station BS 110 computes, independently of the computation of the values of the first figure of merit, one value of the second figure of merit for each possible direction of signal propagation, as already explained with respect to FIG. 7.

Then, the base station BS 110 computes, for each entry point to the multi-hop network 120, the values of the third figure of merit from the value of the first figure of merit for said entry point to the multi-hop network 120 and the value of the second figure of merit for each possible direction of signal propagation in each possible beamforming configuration.

Then, when dynamic beamforming is used, the base station BS 110 selects the beamforming configuration so as to target the entry point to the multi-hop network 120 showing the best value of the third figure of merit with respect to transmission performance between the base station BS 110 and the terminal T and further determines at which instant the transmission between the base station BS 110 and the multi-hop network 120 shall occur so as to target the appropriate entry point to the multi-hop network 120. And, when static beamforming is used, the base station BS 110 only determines, in view of the speed of the multi-hop network 120 in movement and of the direction pointed by the beamforming configuration, at which instant the transmission between the base station BS 110 and the multi-hop network 120 shall occur so as to target the appropriate entry point to the multi-hop network 120.

Considering uplink transmissions of data from the terminal T to the base station BS 110, signaling information has to be transmitted from the base station BS 110 to the terminal T, so as to indicate to the terminal T at least via which entry point of the multi-hop network 120 said data has to be transmitted to the base station BS 110.

Figure 4:
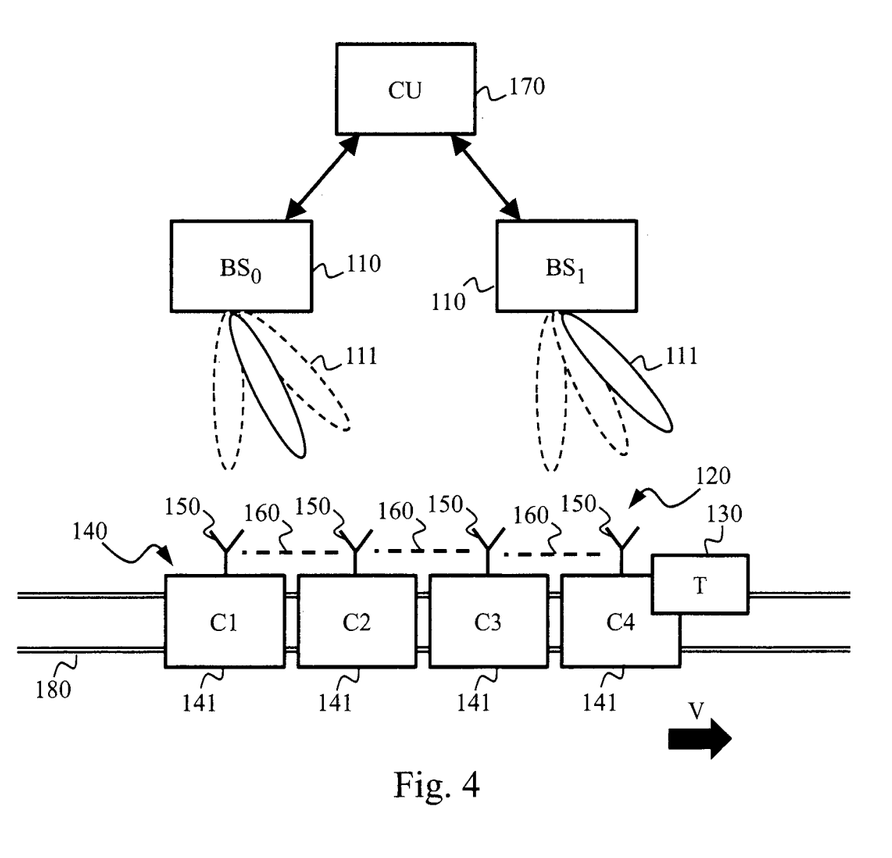
FIG. 4 schematically represents a use case of the second context depicted in FIG. 3.

FIG. 4 schematically represents a use case of the second context depicted in FIG. 3. The terminal T 130 is on-board a train 140 having four cars C1, C2, C3, C4 141. As an example, the terminal T 130 is a controlling machine adapted to remotely operate the train 140 or assist operation thereof. As another example, the terminal T 130 is an on-board display screen providing travel information to passengers. As yet another example, the terminal T 130 is a passenger web browsing device. As yet another example, the terminal T 130 is a video camera enabling video surveillance in the train.

The train 140 travels on railways 180 with speed V, which may vary over time. Each car C1, C2, C3, C4 141 of the train 140 embeds one node device 150, simply represented by antenna symbols in FIG. 4. The node devices 150 form the multi-hop network 120 with a linear topology. Thus, different parts of the train can be targeted by base stations with beamforming, so as to be able to communicate with the terminal T through the multi-hop network 120.

The multi-hop network 120 may be shared by other devices, such as computers (as in FIG. 2), which may impact routing throughout the multi-hop network 120 in view of bandwidth consumption variations due to such a sharing of the multi-hop network 120.

In a particular embodiment, each car C1, C2, C3, C4 141 of the train 140 embeds one node device 150, each node device 150 being equipped with two antennas respectively placed at the front and rear of the cars C1, C2, C3, C4 141 in question, which enables limiting range communication need between two successive cars.

Base stations $BS_0$, $BS_1$ 110 are placed along the railways 180. A central unit CU 170 interconnects and coordinates the base stations $BS_0$, $BS_1$ 110. The base stations $BS_0$, $BS_1$ 110 use beamforming to increase transmission gain and mitigate interferences. Beamforming can be dynamic or static.

When beamforming is static, plural directions of signal propagation exist for the sole beamforming configuration that can be used, as already explained with respect to FIG. 7. The second figure of merit enables deciding which direction shall be favored among the possible directions of signal propagation between the considered base station 110 and the multi-hop network 120.

When beamforming is dynamic, plural directions of signal propagation exist for each possible beamforming configuration. The second figure of merit enables deciding which beamforming configuration to be applied and, further, which direction shall be favored among the possible directions of signal propagation between the considered base station 110 and the multi-hop network 120 using the beamforming configuration in question.

For each entry point to the multi-hop network 120, the node device 150 to which the terminal T 130 is connected computes a value of the first figure of merit, so as to classify the possible routing options throughout the multi-hop network 120 for reaching the terminal T 130. When several options exist to reach the terminal T 130 from one entry point of the multi-hop network 120 thanks to multipath capacity of the multi-hop network 120, the node device 150 in question retains the value of the first figure of merit showing the best routing performance. Details about path selection in multipath conditions can be found in "*Path selection and multipath congestion control*", Key P., Massoulié L. & Towsley D., IEEE INFOCOM 2007-26th IEEE International Conference on Computer Communications, pp. 143-151, May 2007. Then the node device 150 in question transmits the computed values of the first figure of merit to the base station BS 110, potentially via at least one other node device of the multi-hop network 120 and potentially via another base station and one or more intermediate backbone infrastructure devices, such as the central unit CU 170.

When there is a significant change in capacity of at least one link between the node devices 150 of the multi-hop network 120 (node device disappearance for instance due to detachment of cars from the train, node device appearance due to attachment of cars to the train, modification of bandwidth consumption above a predefined threshold . . . ), the node devices 150 recompute the values of the first figure of merit and provide updated values thus computed toward the base station BS 110, as already presented above.

The base station BS 110 computes, independently of the computation of the values of the first figure of merit, one value of the second figure of merit for each possible direction of signal propagation in each possible beamforming configuration, as already explained above with respect to FIG. 7.

Then, the base station BS 110 computes, for each entry point to the multi-hop network 120, the value of the third figure of merit from the values of the first figure of merit for said entry point to the multi-hop network 120 and the value of the second figure of merit for each possible direction of signal propagation in each possible beamforming configuration.

When beamforming is static, the base station BS 110 selects the direction of signal propagation configuration showing the best value of the third figure of merit with respect to transmission performance between the base station BS 110 and the multi-hop network 120. Then, the base station BS 110 determines the instant at which the transmission shall be performed. This is the instant at which the node device 150 is expected to be in line of sight of said direction of signal propagation. The base station BS 110 estimates this instant by taking into consideration a timestamped position of the train 140, the relative position of said node device 150 on the train 140, the speed of the train 140, and the railway 180 distance separating the timestamped position of the train 140 and the position on the railway 180 where said line of sight crosses the railway 180. Timestamped position of the train may be obtained for instance from a GPS (Global Positioning System) device installed in the train, or from cab signalling, wherein a position information is associated with a time information representing the instant at which said position has been sensed.

When beamforming is dynamic, the base station BS 110 selects the beamforming configuration showing the best value of the third figure of merit with respect to transmission performance between the base station BS 110 and the multi-hop network 120. Said best value of the third figure of merit is associated with a particular direction of signal propagation achievable using the selected beamforming configuration. Then, the base station BS 110 determines the instant at which the transmission shall be performed. This is the instant at which the node device 150 is expected to be in line of sight of said direction of signal propagation. The base station BS 110 estimates this instant by taking into consideration the actual position of the train 140, the relative position of said node device 150 on the train 140, the actual speed of the train 140 and the railway 180 distance separating the actual position of the train 140 and the position on the railway 180 where said line of sight crosses the railway 180.

Considering uplink transmissions of data from the terminal T to the base station BS 110 in question, signaling information has to be transmitted to the terminal T from the base station BS 110, or another base station acting as a relay, so as to indicate to the terminal T at least via which entry point of the multi-hop network 120 said data has to be transmitted to the base station BS 110.

When there is a change in the value of the first figure of merit for at least one entry point of the multi-hop network 120 and/or in the value of the second figure of merit for at least one direction of signal propagation, the base station BS 110 recomputes the value of the third figure of merit that respectively implies said at least one entry point of the multi-hop network 120 and/or said direction of signal propagation. Then the base station BS 110 adapts, if needed, the beamforming configuration so as to target the entry point to the multi-hop network 120 showing the best value of the third figure of merit with respect to transmission performance between the base station BS 110 and the terminal T.

Figure 5:
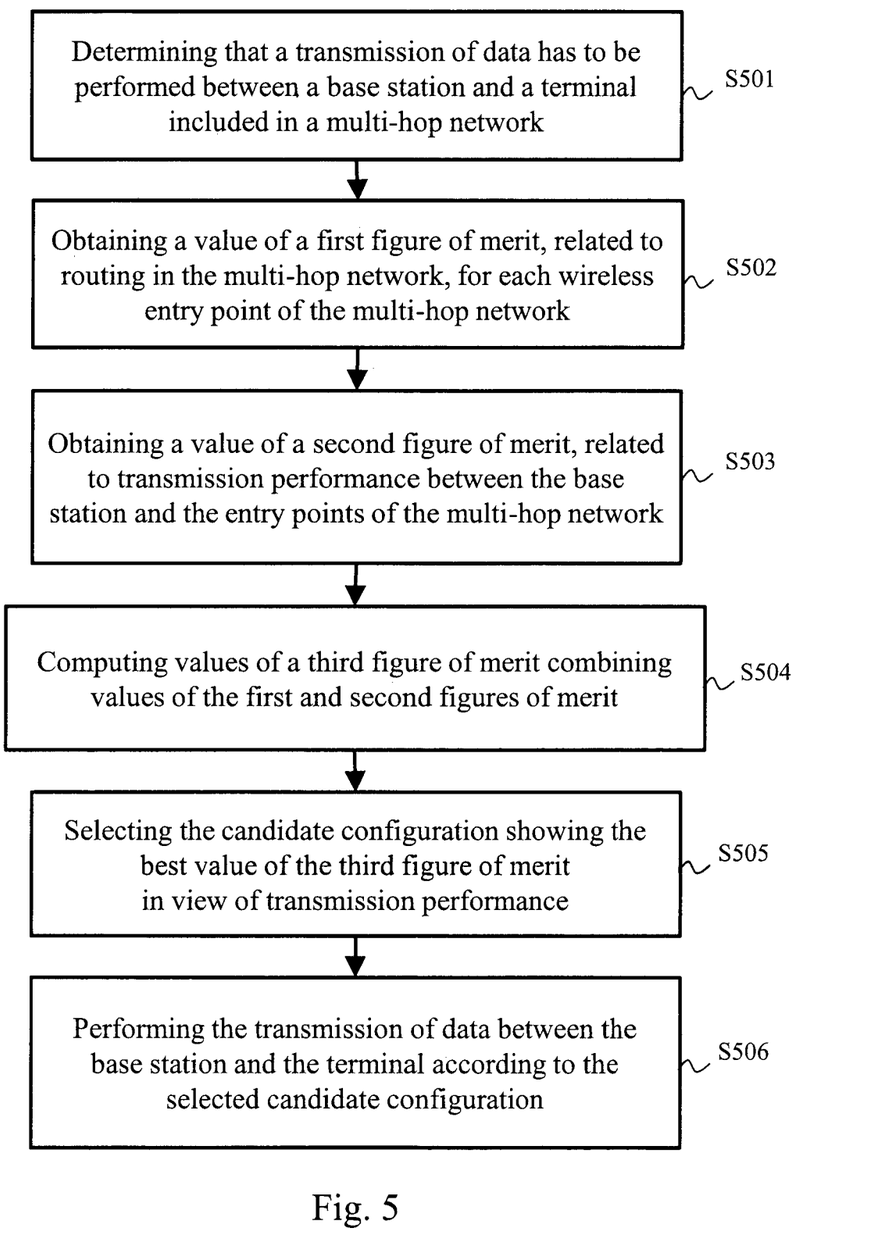
FIG. 5 schematically represents an algorithm for performing transmission of data between a base station and a terminal, in the first context or in the second context.

FIG. 5 schematically represents an algorithm for performing transmission of data between the base station BS 110 and one terminal, in the first context or in the second context presented above.

In a step S501, the base station BS 110 determines that a transmission of data has to be performed between the base station BS 110 and the terminal in question. The transmission may be a downlink transmission, namely from the base station BS 110 to the terminal in question. The transmission may be an uplink transmission, namely from the terminal in question to the base station BS 110.

In a step S502, the base station BS 110 obtains a value of the first figure of merit for each entry point of the multi-hop network 120. The values of the first figure of merit may be received from another base station acting as a relay for the base station BS 110. The values of the first figure of merit may be received from a central unit CU coordinating base stations of the telecommunications network. As already explained, the values of the first figure of merit are computed and provided by the multi-hop network 120. In a particular embodiment, each value of the first figure of merit depends on transmission latency and/or achievable throughput between the entry point of the multi-hop network with which said value of the first figure of merit is associated and the terminal in question.

According to a first embodiment, the first figure of merit represents total throughput, for example total throughput dedicated to a particular service s, between the entry point of the multi-hop network 120 with which the considered value of the first figure of merit is associated and the terminal in question. Service s is here a type of service with which are associated the data to be transmitted between the base station BS 110 and the terminal in question. In the case where the multi-hop network 120 does not provide service-based routing resources allocation, throughput is considered here without any service-based restriction. Assuming that possible paths from said entry point of the multi-hop network 120 and the terminal form a set, $\mathcal{P}$ the throughput for the service s between said entry point of the multi-hop network 120 and the terminal in question by using a routing path $r \in \mathcal{P}$ is denoted as $R_r^{(s)}$, then the first figure of merit $f_1$ can be written as:

$$f_1 = \sum_{r \in \mathcal{P}} R_r^{(s)}.$$

According to a second embodiment that is related to a best-effort type of service such as TCP (Transmission Control Protocol, as specified in the normative document RFC 793), the first figure of merit $f_1$ represents a weighted alpha fair metric that can be written as:

$$f_1(x) = \begin{cases} w_s \dfrac{x^{1-\alpha}}{1-\alpha}, & \alpha \neq 1 \\ w_s \log x, & \alpha = 1 \end{cases}$$

where $x = R_r^{(s)}$, $r \in \mathcal{P}$ represents the throughput for the service s between said entry point of the multi-hop network 120 and the terminal in question by using a routing path $r \in \mathcal{P}$, $\alpha$ represents a fairness factor, and $w_s$ represents a weight coefficient. Details about such a weighted alpha fair metric can be found at section 3.1 "*Fairness*" in "*Fair end-to-end window based congestion control*", J. Mo and J. Walrand, International Symposium on Voice, Video and Data Communications, 1998.

According to a third embodiment that is related to a video streaming type of service, the first figure of merit $f_1$ represents an s-curve metric that can be written as:

$$f_1(R_r^{(s)}) = \frac{1 - e^{-C_1 \left(\frac{R_r^{(s)}}{r^{(s)}}\right)^{C_2}}}{1 - e^{-C_1}}$$

where $R_r^{(s)}$ represents throughput for the service s between said entry point of the multi-hop network 120 and the terminal in question by using a routing path $r \in \mathcal{P}$, $r^{(s)}$ represents data rate at which the data (e.g., video) of the service s are encoded, $C_1$ represents a first constant and $C_2$ represents a second constant. The first constant $C_1$ and the second constant $C_2$ are related to the properties of an encoder encoding the data to be transmitted between the base station BS 110 and the multi-hop network 120 and the encoded sequence. Details about such an s-curve metric, as well as settings for the first constant $C_1$ and the second constant $C_2$, can be found in "*System Model/Traffic Model*" in "*Multicast scheduling with resource fairness constraints*", V. Vukadinovic and G. Karlsson, ACM/Springer Wireless Netw., vol. 15, no. 5, pp. 571-583, July 2009, especially at section II.B.

According to a fourth embodiment, the first figure of merit represents latency for service s between the entry point of the multi-hop network 120 with which the considered value of the first figure of merit is associated and the terminal in question. Assuming that possible paths from said entry point of the multi-hop network 120 and the considered terminal form a set $\mathcal{P}$, let $l \in \mathcal{P}$ denote a point-to-point link that belongs to a routing path $r \in \mathcal{P}$, and let the latency for the point-to-point link l for service s be denoted $Q_l^{(s)}$ (potentially including intra-node processing as well as inter-node transmission), then the first figure of merit $f_1$ can be written as:

$$f_1 = \max_{r \in \mathcal{P}} \sum_{l \in r} Q_l^{(s)}.$$

Service s is here a type of service with which are associated the data to be transmitted between the base station BS 110 and the terminal in question. In the case where the multi-hop network 120 does not provide service-based routing resources allocation and traffic priority management, latency is considered here without any service-based restriction. The latency $Q_l^{(s)}$ for the point-to-point link l for service s can be calculated based on the current state of the buffer of the emanating node of point-to-point link 1, the throughput for each service s using a routing path r and the priority order for different service types.

In a step S503, the base station BS 110 obtains, independently of the values of the first figure of merit, a value of the second figure of merit representative of transmission performance between the base station and the multi-hop network 120, for each candidate configuration of transmission between the base station and the entry points of the multi-hop network 120. Each candidate configuration is, according to a particular embodiment, a couple formed by one targeted entry point of the multi-hop network and a beamforming configuration among a predefined set of beamforming configurations. Each candidate configuration is, according to a particular embodiment, a couple formed by one targeted entry point of the multi-hop network and a direction of signal propagation by applying a predefined beamforming to the base station BS 110. Each candidate configuration is, according to a particular embodiment, a couple formed by one targeted entry point of the multi-hop network and an instant (such as reference to a time slot) at which the transmission of data in question might be performed; as already explained, knowledge of speed and timestamped position of a conveyance, such as a train, embedding the multi-hop network 120 might be used for that purpose.

As already explained, the second figure of merit can be estimation of path loss, estimation of achievable throughput or of channel capacity, or estimation of incurred latency. The second figure of merit may take further into account at least one other metric. In a particular embodiment, such at least one other metric is related to performance achievable by at least one other base station adjacent to base station BS 110 when the base station BS 110 uses each candidate configuration.

In a step S504, the base station BS 110 computes values of the third figure of merit combining values of the first figure of merit for each entry point of the multi-hop network 120 and of the second figure of merit for each respective candidate configuration. The third figure of merit is thus representative of a trade-off between routing performance throughout the multi-hop network 120 and transmission performance between the base station BS 110 and the multi-hop network 120. The third figure of merit is therefore a combination of the first and second figures of merit, for example by an addition of the results of the first and second figures of merit, or of a minimum of results of the first and second figures of merit. The third figure of merit preferably uses normalized results of the first and second figures of merit.

In a step S505, the base station BS 110 selects the candidate configuration, including the entry point of the multi-hop network, which shows the best value of the third figure of merit in view of transmission performance between the base station BS 110 and the terminal in question. The candidate configuration enables to perform the transmission of data with the terminal in question via the entry point in question. It means that the base station BS 110 thus has knowledge of the entry point of the multi-hop network 120 via which the transmission of data will have to take place.

In a step S506, the base station BS 110 and the terminal in question perform the transmission of data. The transmission of data is performed according to the candidate configuration that has been selected in the step S505. The transmission of data is performed via the entry point of the multi-hop network 120 which has been selected in the step S505.

When the transmission of data is a downlink transmission, the base station BS 110 may indicate inside the transmitted data, typically in a dedicated header field, via which entry point of the multi-hop network 120 the transmission of data is expected to be performed.

When the transmission of data is an uplink transmission, the base station BS 110 provides to the terminal, in advance of said transmission, signaling information indicating via which entry point of the multi-hop network 120 the transmission of data is expected to be performed. The signaling information may further include information about the candidate configuration that has been selected in the step S505, such as for example, an instant (such as a time slot) at which the transmission is supposed to be performed. The terminal in question routes the data throughout the multi-hop network 120 so as to reach the entry point in question and so that the entry point in question transmits the data to the base station BS 110.

The algorithm of FIG. 5 is detailed here above considering implementation by the base station BS 110. The algorithm of FIG. 5 may be instead implemented, on behalf of the base station BS 110, by a device connected thereto, such as a central unit that interconnects plural coordinated base stations likely to communicate with the multi-hop network 120. In this case, the central unit provides to the base station BS 110 which candidate configuration to be applied. The central unit may thus instruct the base station BS 110, or another base station, to transmit to the multi-hop network 120 signaling information so as to provide to the multi-hop network information about the candidate configuration to be applied (more particularly for indicating which entry point of the multi-hop network 120 has to be used for an uplink transmission).

Embodiments disclosed above rely on uplink feedback from the multi-hop network 120. The goal of such feedback is to provide information, such as values of the first figure of merit representative of routing performance throughout the multi-hop network, as well as CSI or buffer status, to the base station BS 110 (possibly via another base station). It has to be understood that philosophy is not the same as for downlink transmission configuration, in which the goal is to attempt optimizing throughput or latency. Indeed, as long as the uplink feedback information can be correctly received within a certain time limit, the quality or the capacity of uplink transmission channel is not cared about. Therefore, one can imagine the uplink feedback to be a simple periodic broadcast of such information, without any specific beamforming, for instance with a maximum transmit power so as to ensure information delivery within the certain time limit.

Figure 6:
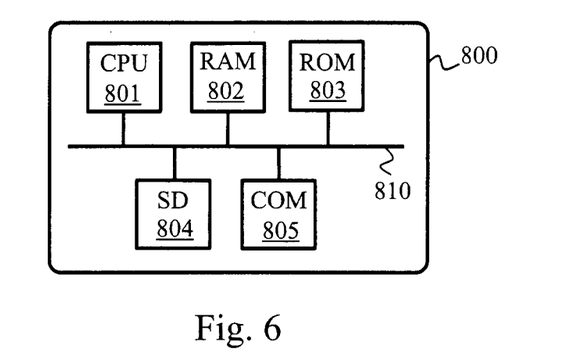
FIG. 6 schematically represents an example of hardware architecture of a communication device used in the first context or in the second context.

FIG. 6 schematically represents an example of hardware architecture of a communication device 800 used in the first context or in the second context. The communication device 800 may be any and all the base stations BS, $BS_0$, $BS_1$ The communication device 800 may be any and all node devices 150. The communication device 800 may be any and all terminals 130 or a hardware control unit thereof. The communication device 800 may be the control unit CU 170.

According to the shown example of hardware architecture, the communication device 800 comprises at least the following components interconnected by a communication bus 810: a processor, microprocessor, microcontroller or CPU (Central Processing Unit) 801; a RAM (Random-Access Memory) 802; a ROM (Read-Only Memory) or Flash memory 803; an HDD (Hard-Disk Drive) or an SD (Secure Digital) card reader 804, or any other device adapted to read information stored on non-transitory information storage medium; and at least one communication interface COM 805 so as to enable communications as described herein.

CPU 801 is capable of executing instructions loaded into RAM 802 from ROM 803 or from an external memory, such as an SD card via the SD card reader 804. After the communication device 800 has been powered on, CPU 801 is capable of reading instructions from RAM 802 and executing these instructions. The instructions form one computer program that causes CPU 801 to perform some or all of the steps of the algorithms described herein with respect to the communication device 800 in question.

Consequently, it is understood that any and all steps of the algorithm described herein may be implemented in software form by execution of a set of instructions or program by a programmable computing machine, such as a DSP (Digital Signal Processor) or a microcontroller; or else implemented in hardware form by a machine or a dedicated chip or chipset, such as an FPGA (Field-Programmable Gate Array) or an ASIC (Application-Specific Integrated Circuit). In general, the communication device 800 in question comprises processing electronics circuitry adapted and configured for implementing the relevant steps as described herein with respect to the communication device 800 in question.

The invention claimed is:

1. A method for performing a transmission of data between a base station and a terminal, the terminal being included in a multi-hop network, the base station is able to communicate with entry points of the multi-hop network using beamforming, characterized in that the method includes:
obtaining, from the multi-hop network, for each entry point of the multi-hop network, a value of a first figure of merit representative of routing performance throughout the multi-hop network between said entry point of the multi-hop network and said terminal;
computing, independently of the values of the first figure of merit, a value of a second figure of merit representative of transmission performance between the base station and the multi-hop network, one value of the second figure of merit being computed for each candidate configuration among predefined candidate configurations of transmission between the base station and the entry points of the multi-hop network;
computing values of a third figure of merit combining values of the first figure of merit and of the second figure of merit, the third figure of merit being representative of a trade-off between routing performance throughout the multi-hop network and transmission performance between the base station and the multi-hop network;
selecting, for performing the transmission of data, a candidate configuration which shows the best value of the third figure of merit according to transmission performance between the base station and the terminal; and
performing the transmission of data via the selected entry point of the multi-hop network and by applying the selected candidate configuration.

2. The method according to claim 1, wherein each candidate configuration is:
a couple formed by one targeted entry point of the multi-hop network and a beamforming configuration of the base station among a predefined set of beamforming configurations; or
a couple formed by one targeted entry point of the multi-hop network and a direction of signal propagation by applying a predefined beamforming configuration of the base station; or
a couple formed by one targeted entry point of the multi-hop network and an instant at which the transmission of data in question might be performed by applying a predefined beamforming configuration of the base station.

3. The method according to claim 1, wherein the value of the second figure of merit depends on transmission channel capacity between the base station and the multi-hop network.

4. The method according to claim 1, wherein the value of the second figure of merit depends on latency of transmission between the base station and the multi-hop network.

5. The method according to claim 1, wherein the value of the second figure of merit depends on achievable throughput between the base station and at least one adjacent base station, on the one hand, and the multi-hop network, on the other hand.

6. The method according to claim 1, wherein the value of the second figure of merit depends on latency of transmission between the base station and at least one adjacent base station, on the one hand, and the multi-hop network, on the other hand.

7. The method according to claim 1, wherein the value of the first figure of merit represents transmission latency between the entry point of the multi-hop network with which said value of the first figure of merit is associated and the terminal.

8. The method according to claim 1, wherein the value of the first figure of merit represents achievable throughput between the entry point of the multi-hop network with which said value of the first figure of merit is associated and the terminal.

9. The method according to claim 1, wherein the multi-hop network moves on a predetermined trajectory, and wherein the value of the second figure of merit depends on position on the predetermined trajectory and on speed of the multi-hop network.

10. The method according to claim 9, wherein the multi-hop network is installed on a train, wherein each car of the train embeds one node device of the multi-hop network, each node device being equipped with two antennas respectively placed at the front and rear of the car embedding said node device.

11. A non-transitory information storage medium storing a computer program comprising program code instructions, the program code instructions causing implementation of the method according to claim 1 when the program code instructions are read from the non-transitory information storage medium and run by the programmable device.

12. A system for performing a transmission of data between a base station and a terminal, the terminal being included in a multi-hop network, the base station is able to communicate with entry points of the multi-hop network using beamforming, characterized in that the system includes circuitry to:
  obtain, from the multi-hop network, for each entry point of the multi-hop network, a value of a first figure of merit representative of routing performance throughout the multi-hop network between said entry point of the multi-hop network and said terminal;
  compute, independently of the values of the first figure of merit, a value of a second figure of merit representative of transmission performance between the base station and the multi-hop network, one value of the second figure of merit being computed for each candidate configuration among predefined candidate configurations of transmission between the base station and the entry points of the multi-hop network;
  compute values of a third figure of merit combining values of the first figure of merit and of the second figure of merit, the third figure of merit being representative of a trade-off between routing performance throughout the multi-hop network and transmission performance between the base station and the multi-hop network;
  select, for performing the transmission of data, a candidate configuration which shows the best value of the third figure of merit according to transmission performance between the base station and the terminal; and
  perform the transmission of data via the selected entry point of the multi-hop network and by applying the selected candidate configuration.

* * * * *